Dec. 12, 1944. A. M. TYSON Re. 22,578

PIANO

Original Filed Aug. 1, 1941

A. M. Tyson
INVENTOR.

BY C. A. Snow & Co.

Reissued Dec. 12, 1944

Re. 22,578

UNITED STATES PATENT OFFICE 22,578

PIANO

Archie Mitchell Tyson, Dallas, Tex.

Original No. 2,287,503, dated June 23, 1942, Serial No. 405,088, August 1, 1941. Application for reissue April 24, 1944, Serial No. 532,763

4 Claims. (Cl. 84—189)

This invention relates to pianos and more especially to a means whereby a "singing" tone is produced every time the strings are sounded.

Another object is to provide an attachment for pianos which can be installed readily where vibrations can be transmitted thereto from the sounding board, there being a vibratory element constituting a part of the device which will produce the desired hum or "singing" quality and cause the hum to continue for a short time after the vibration of the sounding board has ceased.

A still further object is to provide an attachment which is simple in construction and can be installed in a space otherwise unused in the instrument.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawing the preferred form of the invention has been shown.

In said drawing

Figure 1:
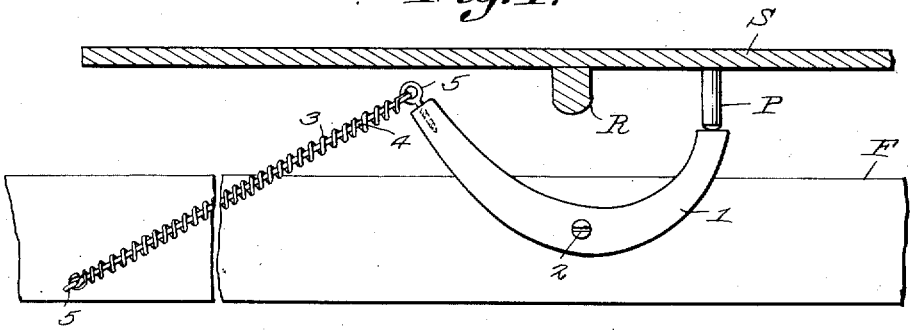
Figure 1 is a section through a portion of a sounding board showing the present attachment combined therewith, parts being broken away.
Figure 2:
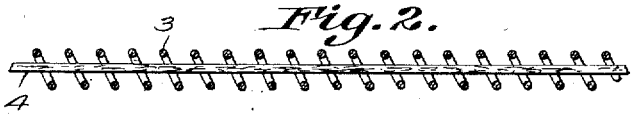
Figure 2 is an enlarged section through a portion of the spring forming a part of the attachment.
Figure 3:
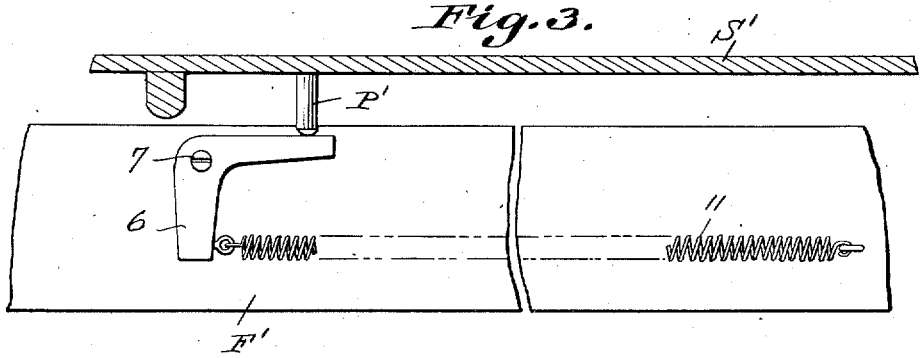
Figure 3 is a view similar to Figure 1 showing a modified structure applicable more especially to grand pianos.

Referring to the figures by characters of reference, S designates a portion of the sounding board of an upright piano, a rib being shown in section at R. Pivotally mounted on the vertical stanchion or frame F at the back of the sounding board is a lever 1 which can be arcuate, as shown, or of any other desired configuration, this lever being adapted to move freely on its pivot 2. One end of the lever contacts with one end of a pin P connected to and projecting from the back surface of the sounding board, this being located preferably close to or back of the bass ridge at a point several inches from the treble bridge. It has been found desirable not to place this pin on a rib near or on the bridge. That end of the lever remote from the pin P has connected to it one end of a coiled spring 3 which is constantly under tension and is anchored at its other end to the stanchion or frame as shown. This spring, which in practice, can be from four to six inches in length and approximately three-eighths of an inch in diameter, is under constant tension for the purpose of holding lever 1 in firm contact with the pin P. Thus when the sounding board is vibrated as a result of the action of the piano hammers on the strings, the vibrations will be transmitted through lever 1 to the spring 3 and this spring will continue to vibrate after vibration of the sounding board has ceased. This results in the production of a singing sound or hum which produces a distinctive quality of tone. For the purpose of preventing the spring from humming or singing with a metallic tone, a small strip of felt 4 can be stretched longitudinally within the convolutions of the spring, this strip being fastened at its ends to the screws 5 or the like used for holding the spring in place.

Where the invention is applied to a grand piano a lever 6 can be pivotally mounted at 7 on the stanchion F′ beneath the sounding board S′, one arm of the lever, as shown, being positioned for contact with one end of a pin P′ depending from the sounding board. The other arm of the lever has a coiled spring anchored thereto and to the stanchion F′, this spring being indicated at 11 and of proper length to produce the desired vibration frequency. The lever can be in the form of a bell-crank as shown.

Figure 4:
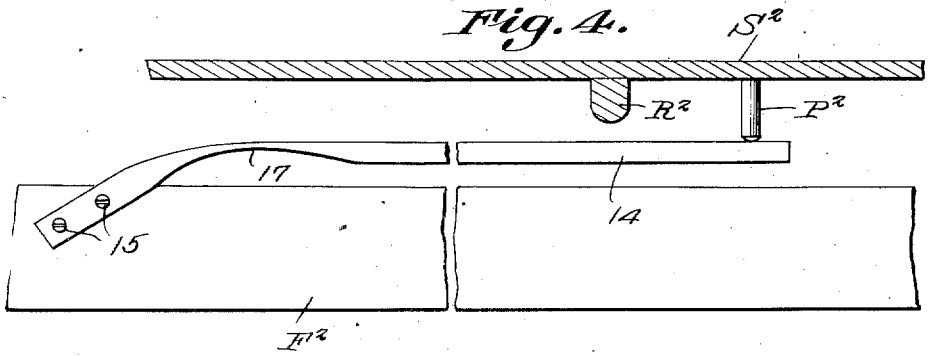
Figure 4 is a view similar to Figure 1 showing a modified construction.

Under some conditions a wooden spring could be used, this spring constituting a reed adapted to hum or "sing" when vibrated. Such an arrangement has been shown in Figure 4 wherein the sounding board $S^2$ has a pin $P^2$ in contact with one end portion of the wooden reed or spring 14 the other end of which is fastened, as at 15, to the stanchion $F^2$. The spring or reed can be reduced in thickness as indicated at 17 to insure the proper frequency of vibration and obviously when the sounding board is vibrated, the vibrations will be transmitted to the reed which, in turn, will continue to vibrate after the sounding board has ceased to vibrate.

In all of the structures illustrated the tone produced by striking the strings will be prolonged in the form of a hum and, as before stated, this results in a quality of tone which has been found very desirable under certain conditions.

Obviously various other modifications of the hum-producing element can be used without departing from the invention as claimed.

What is claimed is:

1. In a stringed musical instrument the combination with a frame, and a sounding board having a string side and a back side, of a spring connected at one end only to the instrument frame and having a vibratory portion substantially parallel with the sounding board, and thrust-transmitting means between the other end of the spring and the back side of the sounding board.

2. In a stringed musical instrument the combination with a sounding board having a string side and a back side, of a spring connected at one end to the instrument and having a vibratory portion substantially parallel with the sounding board, and thrust-transmitting means between the spring and the back side of the sounding board, said means including a lever fulcrumed between its ends, one of said ends being attached to the spring, and a pin carried by the back side of the sounding board and bearing against the other end of the lever.

3. In a stringed musical instrument the combination with a sounding board having a string side and a back side, of a hum-producing coiled spring back of the sounding board and anchored at one end, thrust-transmitting means between the other end of said spring and the back side of the sounding board, and a strip of soft material extending longitudinally of and contacting with the spring.

4. In a stringed musical instrument the combination with a sounding board, of a hum-producing spring at one side of the sounding board, and means for transmitting vibrations between the vibrating portion of the sounding board and the spring, said means including an anchoring connection at one end of the spring.

ARCHIE MITCHELL TYSON.